United States Patent [19]
Calder et al.

[11] 3,955,782
[45] May 11, 1976

[54] TURBINE ENGINES

[75] Inventors: Peter Henry Calder; Neil Milner Evans, both of Bristol, England

[73] Assignee: Rolls-Royce (1971) Limited, London, England

[22] Filed: July 10, 1974

[21] Appl. No.: 487,025

[30] Foreign Application Priority Data
July 11, 1973 United Kingdom............... 32959/73

[52] U.S. Cl................................ 244/53 R; 60/262
[51] Int. Cl.²........................................ B64D 27/16
[58] Field of Search........... 244/53 R, 53 B; 60/269, 60/262; 137/15.1, 15.2

[56] References Cited
UNITED STATES PATENTS

| | | | |
|---|---|---|---|
| 2,663,517 | 12/1953 | Price | 60/262 X |
| 3,161,019 | 12/1964 | Keenan et al. | 244/53 R |
| 3,186,661 | 6/1965 | Denning et al. | 244/53 B |
| 3,673,802 | 7/1972 | Krebs et al. | 60/262 X |
| 3,854,286 | 12/1974 | Klees | 60/262 |

FOREIGN PATENTS OR APPLICATIONS
1,141,493   1/1969   United Kingdom............... 244/53 B

*Primary Examiner*—Trygve M. Blix
*Assistant Examiner*—Barry L. Kelmachter
*Attorney, Agent, or Firm*—Stevens, Davis, Miller & Mosher

[57] ABSTRACT

A gas turbine turbojet engine for a supersonic aircraft which fits into a nacelle having a substantially square cross-section. Air flow passing between the square section of the nacelle and the circular section of the engine is compressed by an auxiliary compressor driven by a compressor of the turbojet. The auxiliary compressor is housed within a diameter not greater than the maximum diameter of the turbojet, thus enhancing the engine performance particularly at take-off.

2 Claims, 6 Drawing Figures

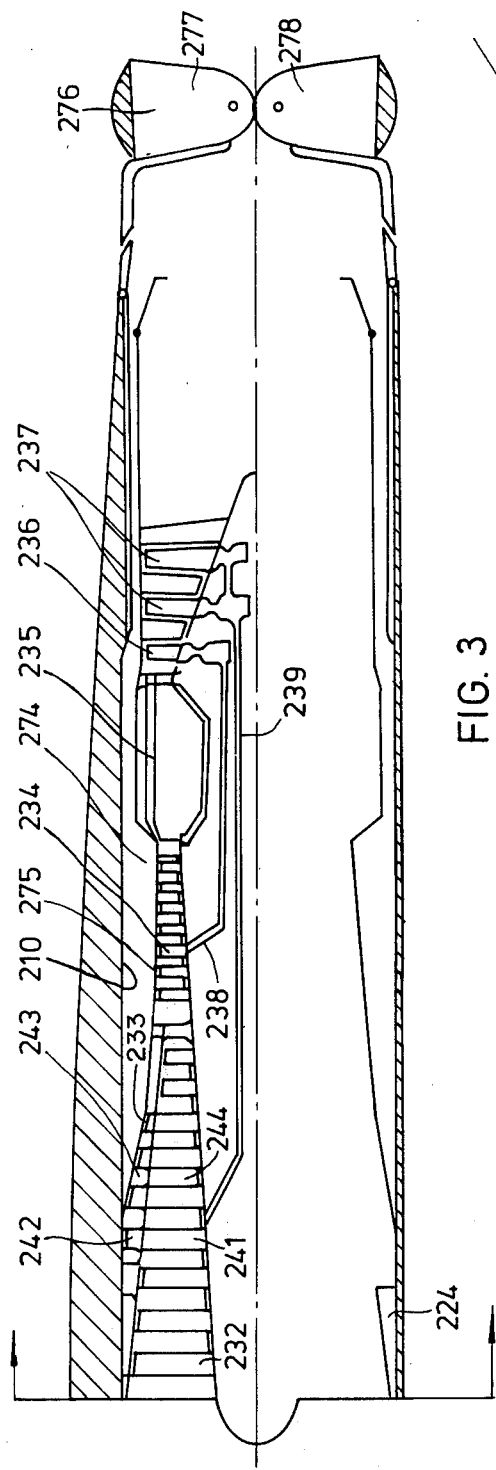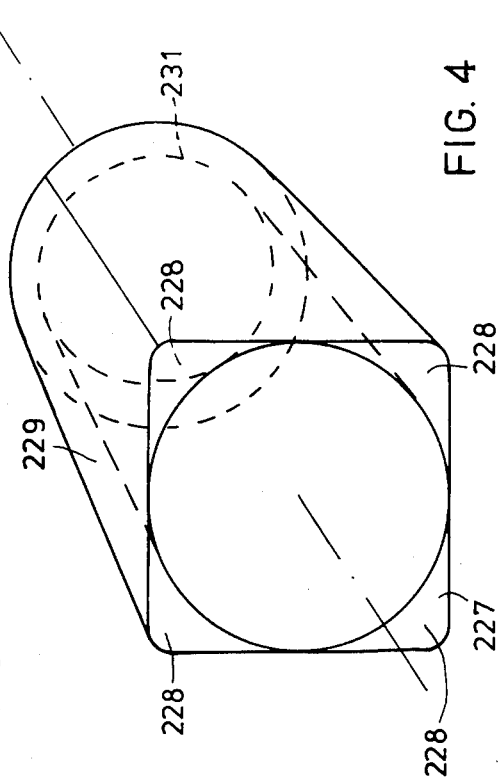
FIG. 3
FIG. 4

TURBINE ENGINES

This invention relates to a gas turbine engine and in particular to an air breathing gas turbine engine suitable for propelling an aircraft at supersonic speeds.

In an aircraft capable of supersonic flight it is convenient to house the gas turbine engine in a nacelle of substantially constant cross-section for the avoidance of wave drag. The intake for the gas turbine engine, and thus the nacelle, is generally of rectangular section as this permits a two dimensional shock system to be employed for diffusing air from supersonic to subsonic speeds prior to further compression within the gas turbine engine.

A consequence of the necessity to adopt a nacelle of rectangular section to supply air to a gas turbine engine of circular section is that there is an excess of nacelle intake area over engine intake area. This excess area can in operation increase the drag of the aircraft.

According to the present invention there is provided a jet propulsion powerplant comprising a gas turbine turbojet engine, a first compressor of the gas turbine turbojet engine, a casing for the engine having a substantially circular cross-section, a nacelle shaped for supersonic flight speeds in which the engine in its casing is located, the nacelle having a substantially square cross-section and defining with the casing a duct which thereby has an exterior periphery which is substantially square in cross-section and an interior periphery which is substantially circular in cross-section, the nacelle having an inlet capable of receiving ambient air at flight speeds up to supersonic speeds and being arranged for supplying air to both said engine and said duct, characterized by an auxiliary axial flow compressor arranged to compress air passing along said duct, at least one row of rotor blades of said auxiliary compressor arranged to be concentric with and driven by the first compressor of the turbojet engine and an auxiliary casing for the auxiliary compressor communicating with said duct, said auxiliary casing having substantially the same diameter as the largest diameter of the gas turbine turbojet engine casing.

An embodiment of the invention will now be described by way of example only with reference to the accompanying drawings wherein:

FIG. 3 is a longitudinal section through a gas turbine engine constructed in a accordance with the present invention.

FIG. 4 is a schematic view of an intake for the gas turbine engine of FIG. 3.

Figure 1:
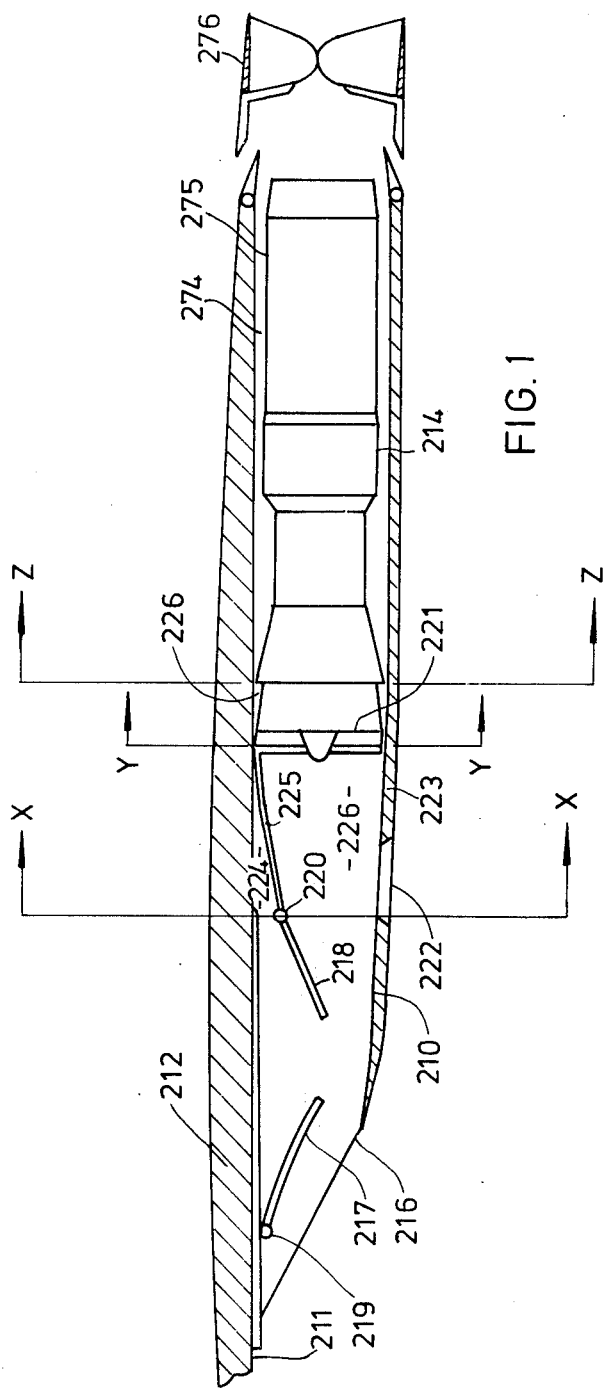
FIG. 1 is a longitudinal section through a nacelle for a gas turbine engine constructed in accordance with the present invention.
Figure 2:
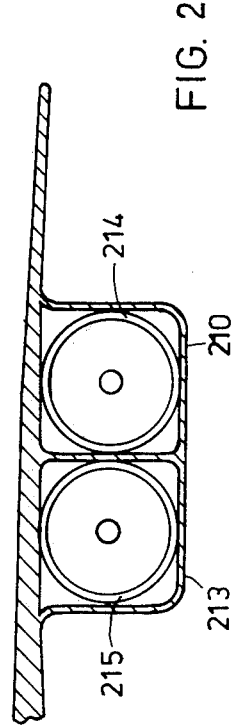
FIG. 2 is a section on the line Y—Y of FIG. 1

Referring now to FIGS. 1 and 2 an engine nacelle 210 suitable for supersonic flight is attached to the underside 211 of the wing 212 of an aeroplane (not shown).

The nacelle is of generally square section and a second nacelle 213 is joined to the first nacelle 210 to accommodate side by side two gas turbine engines 214,215 respectively.

The nacelle 210 can be seen to be of substantially constant section along its length and to be of the minimum width necessary to accommodate the gas turbine engine 214.

At its forward end 216 the nacelle 210 is provided with two ramps 217,218 respectively which are arranged to supply air to the gas turbine engine 214 at the desired intake conditions throughout the range of supersonic speeds for which the engine is intended. The two ramps 217,218 are hinged at their fore and aft ends, 219, 220 respectively and are arranged to move together to vary the shock pattern in the intake and to diffuse the subsonic airflow aft of the intake shock before it reaches the face 221 of the gas turbine engine.

An auxiliary door 222 in the floor 223 of the nacelle is hydraulically operated and pivotable about both its fore and aft ends to enable it to either spill air at supersonic speeds or to ingest additional air during ground run and take off conditions. The ramp 218 also divides the airflow through the nacelle and passes part of it into the duct 224 between the structure 225 and the wing and the other part into the duct 226 between the structure and the nacelle. It will be understood that in the embodiment shown in FIG. 1 the cross-section of the duct 226 changes from generally rectangular at X—X to circular at Y—Y, the duct 226 being generally divergent for diffusing the intake air to raise the static pressure ahead of the engine face 221.

The duct 224 is also generally rectangular at X—X and changes to the shape of a square with a circular hole in it at Y—Y. This shape can be seen more clearly by referring to FIG. 4 in which it is denoted by the numeral 227. Air passing through the four corners 228 of the square at 227 are conveyed by the duct 229 to the annular openings 231 at the section Z—Z of FIG. 1.

Figures 5, 6:
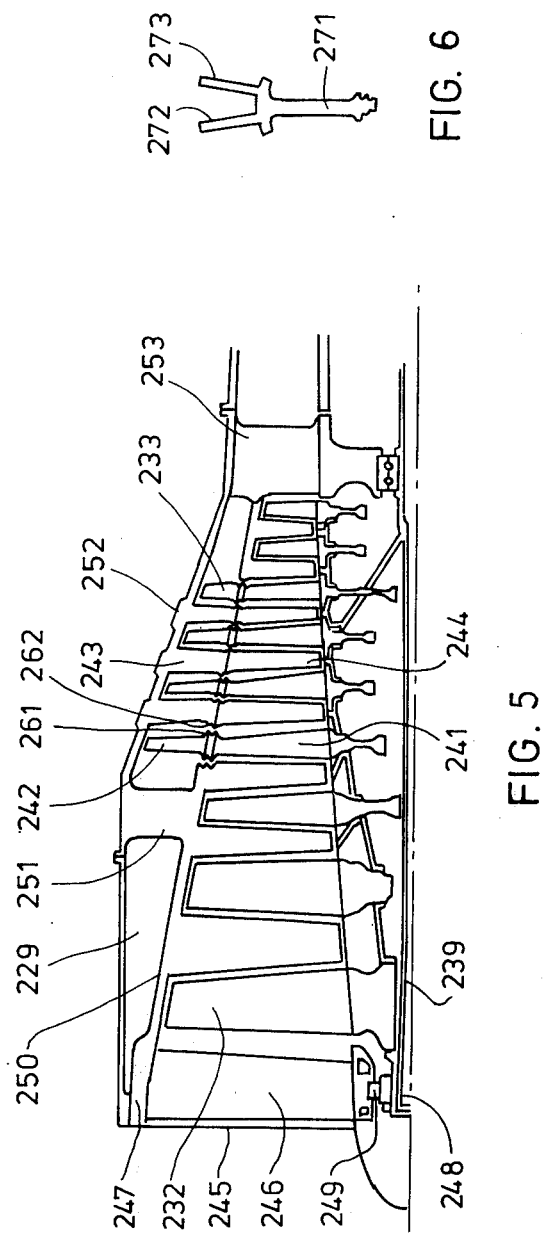
FIG. 5 is a detailed view of the low pressure compressors of the engine of FIG. 3.
FIG. 6 is a detail of the compressor blading of the engine of FIG. 3.

Referring now also to FIGS. 3, 5, the gas turbine engine 214 is provided with first and second low pressure compressors 232,233, both of the bladed axial flow type, and which are concentrically disposed with respect to each other and driven in parallel for jointly supplying compressed air to a high pressure compressor 234 and thence to a combustion chamber 235 wherein the compressed air is mixed with fuel and the mixture burned. The products of combustion drive high and low pressure turbines 236 and 237 which are connected to the high pressure compressor 234 and the low pressure compressor 232 by shafts 238, 239 respectively. The rotor blades 242 of the fourth, fifth, sixth and seventh stages of the first low pressure compressor 232 are extended so that their radially outer ends 242 form the rotor blades of the first, second, third and fourth stages of the second low pressure compressor 233.

In similar fashion the stator blades 243 of the second low pressure compressor are extended radially inwards to form the stator blades 244 of the fourth, fifth and sixth stages of the first low pressure compressor 232.

Co-operating seal components 261 and 262 are machined on blades 241 and 243 respectively to substantially prevent the transfer of compressed air between the first and second low pressure compressors.

The first low pressure compressor 232 draws air from the circular aperture 245, through inlet guide vanes 246 which extend from the inner part 247 of the compressor casing 250 to support the forward end 248 of the shaft 239 via a roller bearing 249. The second low pressure compressor 233 draws air through the annular opening 231 (FIG. 4) and past inlet guide vanes 251 which extend from the outer part 252 of the compressor casing to the inner part 247. It will be seen that the inner part 247 surrounds part of the first compressor and the outer part 252 surrounds the second compressor and the remainder of the first compressor and that the inner and outer parts together form the compressor casing 250. The axial stress in the compressor casing passes between the outer part 252 and the inner part 247 by way of the guide vanes 251. The blading of the first and second low pressure compressors is designed so that the delivery pressures of the first and second low pressure compressors are the same throughout their range of operations and the total delivery can then be mixed, after passing the struts 253 prior to being further compressed by the high pressure compressor before passing to the combustion chamber 235. To assist in matching the delivery pressures of the two low pressure compressors the arrangement of FIG. 6 may be adopted for the rotor blades in which each blade 271 of the first low pressure compressor 232 is connected to two blades 272,273, of the second low pressure compressor 233. It will be readily appreciated that a similar inverted arrangement may be employed for the stator blading common to the two low pressure compressors 231,233.

It will be further appreciated that the two low pressure compressors are together drawing air from the entire cross-sectional area of the nacelle 210. In operation it is necessary to pass a cooling airflow along the duct 274 between the engine casing 275 and the nacelle 210. This cooling air flow can be supplied either by dividing the airflow between the ramp 218 and the wing so that only a part of it is ducted to the second low pressure compressor 233 or by a boundary layer bleed (not shown) from the surface of the wing 212.

The exhaust gases from the engine together with the cooling flow along the duct 274 may be exhausted from the nacelle by way of a nozzle 276 formed between two movable bucket members 277,278 respectively, well known per se and not forming part of the present invention.

In an alternative embodiment not shown but readily understood by referring to FIG. 1 the airflow between the ramp 218 and the wing 212 is used solely for cooling the gas turbine engine and the duct 226 instead of changing from a rectangular section at X—X to a circular section at Y—Y remains rectangular at Y—Y and the air not accepted by the first low pressure compressor 232 is conveyed by a duct (similar to that shown in FIG. 4) to the second low pressure compressor 233.

Because the second low pressure compressor is connected to the first low pressure compressor it can be treated as being governed by the low pressure spool of the engine and thus an arrangement of valves (not shown) can be adopted so that the second low pressure compressor is used, for example, only for take off or transonic operation. The load of the first low pressure compressor will prevent overspeeding of the low pressure turbine 237.

In the embodiment shown the engine has both low and high pressure compressors 232, 233 and 234 respectively but it is of course contemplated that engines according to the invention can be constructed in which there are only two low pressure compressors driven in parallel and arranged to supply compressed air directly to a combustion chamber.

What we claim is:

1. A jet propulsion powerplant comprising a gas turbine two-spool turbojet engine, a first compressor of the gas turbine turbojet engine, said first compressor being the low-pressure compressor of said engine and having a plurality of stages which successively decrease in diameter in the direction of flow, a casing for the engine having a substantially circular cross-section, a nacelle shaped for supersonic flight speeds in which the engine in its casing is located, the nacelle having a substantially square cross-section and defining with the casing a duct which thereby has an exterior periphery which is substantially square in cross-section and an interior periphery which is substantially circular in cross-section, the nacelle having an inlet capable of receiving ambient air at flight speeds up to supersonic speeds and being arranged for supplying air to both said engine and said duct, characterized by an auxiliary axial flow compressor arranged to compress air passing along said duct, each rotor blade stage of said auxiliary compressor being arranged to be concentric with and driven by a respective upstream stage of the first compressor of the turbojet engine such that the outer diameter of each rotor blade stage substantially does not exceed the diameter of the largest first compressor stage, and an auxiliary casing for the auxiliary compressor communicating with said duct, said auxiliary casing having substantially the same diameter as the largest diameter of the gas turbine turbojet engine casing.

2. A jet propulsion powerplant according to claim 1, wherein the blades of the auxiliary compressor are formed integrally with the blades of the first compressor.

* * * * *